(12) United States Patent
Ramsey et al.

(10) Patent No.: US 7,778,871 B2
(45) Date of Patent: *Aug. 17, 2010

(54) OPTIMAL SEQUENCING OF MARKETING EVENTS

(75) Inventors: Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 902 days.

This patent is subject to a terminal disclaimer.

(21) Appl. No.: 11/120,817

(22) Filed: May 3, 2005

(65) Prior Publication Data

US 2006/0253318 A1 Nov. 9, 2006

(51) Int. Cl.
*G06Q 30/00* (2006.01)
(52) U.S. Cl. .............. 705/14.46; 705/14.48; 705/14.43; 705/10; 705/36 R; 706/52
(58) Field of Classification Search .................. 705/14, 705/10, 14.46, 14.43
See application file for complete search history.

(56) References Cited

U.S. PATENT DOCUMENTS

| | | | | |
|---|---|---|---|---|
| 6,067,525 | A * | 5/2000 | Johnson et al. ................ | 705/10 |
| 6,415,270 | B1 * | 7/2002 | Rackson et al. ........... | 705/36 R |
| 6,484,163 | B1 * | 11/2002 | Lawrence et al. .............. | 707/3 |
| 6,567,786 | B1 | 5/2003 | Bibelnieks et al. | |
| 6,925,441 | B1 * | 8/2005 | Jones et al. .................... | 705/10 |
| 6,993,493 | B1 * | 1/2006 | Galperin et al. ............... | 705/10 |
| 7,386,519 | B1 * | 6/2008 | Delurgio et al. ............. | 705/400 |
| 7,613,687 | B2 * | 11/2009 | Nye ................................. | 1/1 |
| 2001/0014868 | A1 | 8/2001 | Herz et al. | |
| 2002/0062249 | A1 * | 5/2002 | Iannacci ...................... | 705/14 |
| 2002/0147670 | A1 * | 10/2002 | Lange ......................... | 705/35 |
| 2002/0198775 | A1 * | 12/2002 | Ryan ........................... | 705/14 |
| 2003/0115128 | A1 * | 6/2003 | Lange et al. .................. | 705/37 |
| 2003/0208402 | A1 * | 11/2003 | Bibelnieks et al. ............ | 705/14 |
| 2003/0216966 | A1 * | 11/2003 | Saenz et al. .................. | 705/14 |
| 2003/0220773 | A1 * | 11/2003 | Haas et al. ..................... | 703/2 |
| 2004/0003400 | A1 * | 1/2004 | Carney et al. ................. | 725/42 |

(Continued)

FOREIGN PATENT DOCUMENTS

WO WO 99/22328 5/1999

OTHER PUBLICATIONS

John G. Freeland; The Ultimate CRM Handbook, "Marketing by the Numbers: How to Optimize Marketing ROI"; Strategies and Concepts for Building Enduring Customer Loyality and Profitability; Chapter 26, pp. 231-241.

*Primary Examiner*—James W Myhre
*Assistant Examiner*—Adam Chornesky
(74) *Attorney, Agent, or Firm*—Schmeiser, Olsen & Watts; Anna L. Linne (57) ABSTRACT

A system and method for optimizing and sequencing marketing events for offering to candidates. The system comprises a software application stored on a computer readable medium. The software application comprises an optimization tool and a timing tool. The optimization tool optimizes marketing events from a first list for candidates from a second list. Each marketing event from the first list comprises a marketing offer and an identified channel means for communicating the marketing offer. The timing tool determines an optimal sequence for offering each of the optimized marketing events to the candidates.

31 Claims, 4 Drawing Sheets

U.S. PATENT DOCUMENTS

| | | | |
|---|---|---|---|
| 2004/0015386 A1* | 1/2004 | Abe et al. | 705/10 |
| 2004/0093296 A1* | 5/2004 | Phelan et al. | 705/36 |
| 2005/0065845 A1* | 3/2005 | DeAngelis | 705/14 |
| 2005/0198157 A1* | 9/2005 | Young et al. | 709/206 |
| 2005/0216525 A1* | 9/2005 | Wachholz-Prill et al. | 707/201 |
| 2005/0273386 A1* | 12/2005 | Weidner | 705/14 |
| 2006/0085255 A1* | 4/2006 | Hastings et al. | 705/14 |
| 2006/0149615 A1* | 7/2006 | Andrews et al. | 705/10 |
| 2006/0253318 A1* | 11/2006 | Ramsey et al. | 705/14 |
| 2008/0021794 A1* | 1/2008 | Vega | 705/26 |

\* cited by examiner

OPTIMAL SEQUENCING OF MARKETING EVENTS

BACKGROUND OF THE INVENTION

1. Technical Field

The present invention relates to a system and associated method for optimizing and sequencing outbound marketing events for offering to a candidate.

2. Related Art

Selling a plurality of services to a customer typically requires a complicated series of steps. Therefore there exists a need for a simple procedure to sell a plurality of services to a customer.

SUMMARY OF THE INVENTION

The present invention provides a computer system comprising a processor and a computer readable memory unit coupled to the processor, said memory unit containing a first list identifying marketing events, a second list of candidates, and a software application that when executed by the processor implements a method for sequencing said marketing events from said first list, said software application comprising an optimization tool and a timing tool, wherein each of said marketing events from said first list comprises a marketing offer and an identified channel means for communicating said marketing offer, said method comprising the computer implemented steps of:

optimizing by said optimization tool, said marketing events from said first list for candidates from said second list; and determining by said timing tool, an optimal sequence for offering each of said optimized marketing events to said candidates.

The present invention provides a database system, comprising:

a first database structure storing a first list identifying marketing events, wherein each marketing event from said first list comprises a marketing offer and an identified channel means for communicating said marketing offer;

a second database structure storing a second list of candidates; and a database manager software application stored on a computer readable medium, wherein said database manager software application comprises an optimization tool and a timing tool, wherein said optimization tool is for optimizing said marketing events from said first list for said candidates from said second list, and wherein said timing tool is for determining an optimal sequence for offering each of said optimized marketing events to said candidates.

The present invention provides a marketing method, comprising:

providing a software application stored on a computer readable medium, wherein said software application comprises an optimization tool and a timing tool;

optimizing by said optimization tool, marketing events from a first list for candidates from a second list, wherein each marketing event from said first list comprises a marketing offer and an identified channel means for communicating said marketing offer; and determining by said timing tool, an optimal sequence for offering each of said optimized marketing events to said candidates.

The present invention provides a process for integrating computing infrastructure, comprising integrating computer-readable code into a computing system, wherein the code in combination with the computing system comprises a first list identifying marketing events, a second list of candidates, and a software application, said software application comprising an optimization tool and a timing tool, wherein each of said marketing events from said first list comprises a marketing offer and an identified channel means for communicating said marketing offer, and wherein the code in combination with the computing system is adapted to implement a method for performing the steps of:

optimizing by said optimization tool, said marketing events from said first list for said candidates from said second list; and determining by said timing tool, an optimal sequence for offering each of said optimized marketing events to said candidates.

The present invention provides a computer program product, comprising a computer usable medium having a computer readable program code embodied therein, said computer readable program code comprising an algorithm adapted to implement a method for sequencing marketing events from a first list identifying said marketing events, wherein each of said marketing events from said first list comprises a marketing offer and an identified channel means for communicating said marketing offer, said method comprising the steps of:

optimizing, said marketing events from said first list for candidates from a second list; and determining, an optimal sequence for offering each of said optimized marketing events to said candidates.

The present invention advantageously provides a system and associated method to implement a simple procedure to sell a plurality of services to a customer.

DETAILED DESCRIPTION OF THE INVENTION

Figure 1:
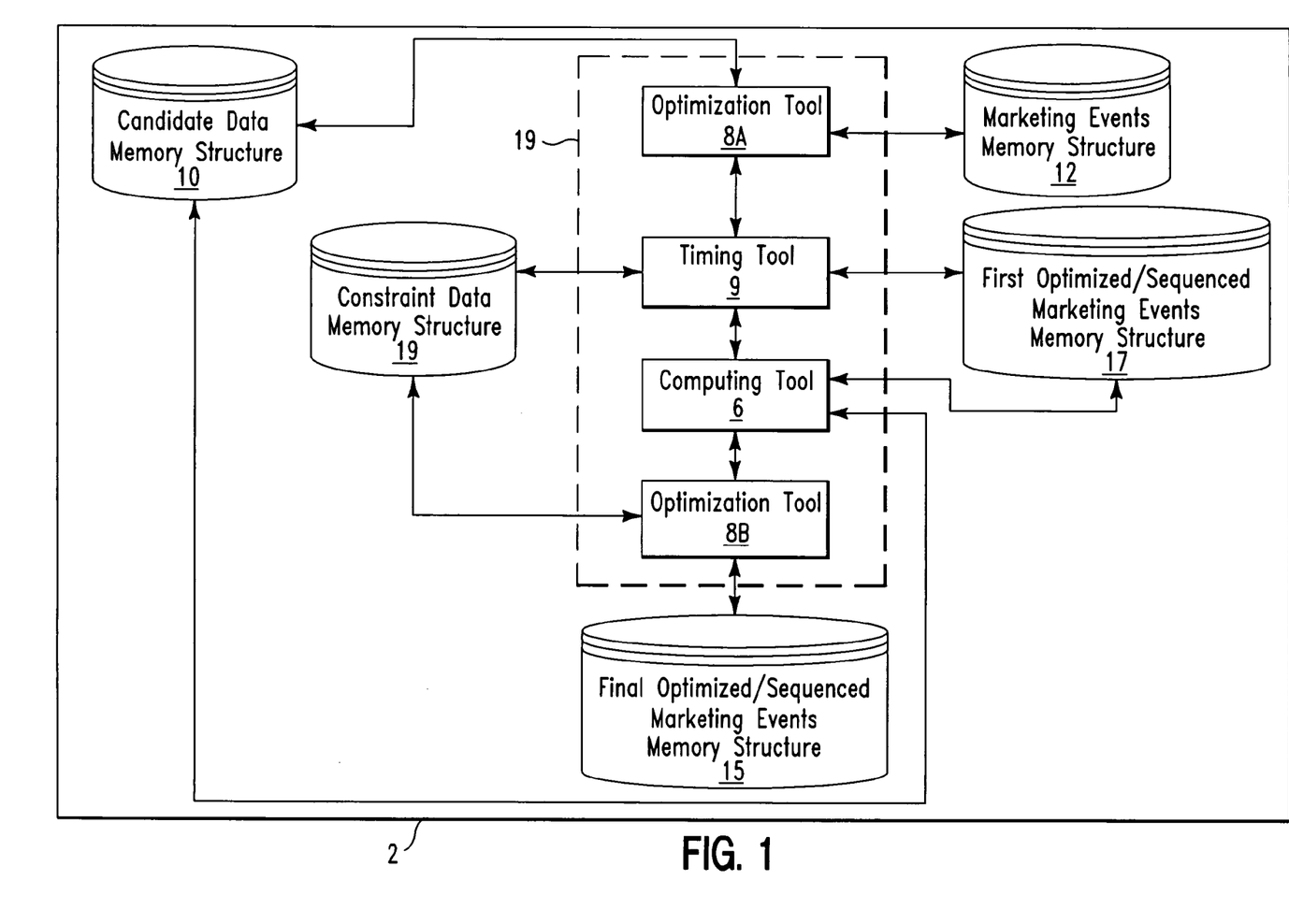
FIG. 1 illustrates a block diagram view of a computing system for optimizing and sequencing outbound marketing events for offering to candidates, in accordance with embodiments of the present invention.

FIG. 1 illustrates a block diagram view of a computing system 2 for optimizing and sequencing outbound marketing events for offering to candidates, in accordance with embodiments of the present invention. Each marketing event comprises a marketing offer and an identified channel means (e.g., e-mail, direct mail, text message, telephone, etc.) for communicating the marketing offers to candidates. For example, a marketing event may comprise a 1.9% APR introductory interest rate for a 12 month period on a credit card, delivered to the candidate through direct mail. A marketing event may either comprise a growth (new marketing offer) marketing event or a retention (existing product like an existing credit card to be retained) marketing event. A marketing offer is defined herein as an offer from an entity (e.g., a business) for a product or service to be extended to customers or potential customers (i.e., candidates). The product or service may comprise an incentive to entice the customers or potential customers to accept the offer. For example, the marketing offer may comprise a credit card offer that will provide an APR that is lower than the normal for a specified period of time as an incentive, such as, inter alia, 1.9% APR for the first 12 months if the credit card is accepted. Candidates may be an existing customers of the entity and potential customers for the marketing offer. For example, an individual, a business, etc. A channel is a means to contact the candidates. For example, e-mail, direct mail, text message, telephone, etc. An outbound marketing event comprises a marketing event where an initial contact is made by an entity to offer the marketing event to candidates. The computing system 2 is used by an entity (e.g., a business such as a bank) comprising existing customers to optimize, determine an optimal sequence for the outbound marketing events (herein referred to marketing events) and determine optimal time intervals between marketing events for offering to candidates from the existing customers. The optimal sequence of marketing events will maximize a return of each marketing event (i.e., profit) while minimizing or reducing overlap effects between the marketing events comprising the optimal sequence. Overlap effects may include, inter alia, cannibalization, saturation, etc. Cannibalization is defined herein as an expected impact (e.g., expressed in a percentage) on a profit of one marketing event in a marketing event stream due to the implementation of another marketing event in the marketing event stream. Saturation is defined herein as a point at which a candidate has received a maximum amount of marketing events comprising a similar type. The computing system 2 comprises memory structures 10, 12, 15, 17, and 19 and a software application 19. The computing system 2 may comprise any type of computing system, including, inter alia, a database system. The software application 19 may comprises any type of computing system managing software application. For example, if the computing system 2 comprises a database system then the software application 19 may comprises a database manager software application. A database manager software application may comprise any type of database management software application including, inter alia, DB2 database management system by IBM, etc. The memory structures 10, 12, 15, 17, and 19 may comprises any type of computer memory structures including, inter alia, hard disc drives, database structures, flash memory, read only memory, random access memory, etc. The software application 19 (e.g., a database manager software application) is a single software application (i.e., one software application as opposed to multiple software applications). The software application 19 comprises a computing tool 6, an optimization tool 8A and 8B, and a timing tool 9 (i.e., software components). Using a single software application (i.e., software application 19) comprising multiple software components (i.e., computing tool 6, timing tool 9, and an optimization tool 8A and 8B) is advantageous over using a plurality of individual software applications (e.g., a first individual software application comprising a computing tool, a second individual software application comprising an optimization tool, a third individual software application comprising a timing tool) because communications between components of single software application (e.g., computing tool 6, timing tool 9 and optimization tool 8A and 8B) are faster and more efficient than communications between multiple individual software applications. Communications between components of a single software application are faster and more efficient than communications between multiple individual software applications because data (for manipulation) only has to be moved within a single software application and does not have to be moved from one software application to another software application. Therefore functions performed on the data (e.g., calculations, optimizations, sequencing, etc) are performed faster and more efficiently by a single software application than by multiple software applications. Each of memory structures 10, 12, 15, 17, and 19 may be individual memory structures within the computing system 2. Alternatively, each of memory structures 10, 12, 15, 17, and 19 may be tables or sections within a single memory structure (e.g., as illustrated in FIG. 1). Memory structure 10 comprises a list of candidates. Additionally, memory structure 10 comprises data models that are constructed using mathematical methods. The mathematical methods use customer (i.e., candidate) data such as, inter alia, past history data (e.g., credit card balances, past spending habits, etc.) to construct the data models. The customer (i.e., candidate) data comprises information about all of the entity's customers, current or prospective. This data may be compiled from any standard source including, inter alia, an existing marketing memory containing data regarding active customers of the entity. The customer data primarily comprises behavioral data (e.g., purchasing history, returned-items history, payment history, etc), promotional (i.e., marketing events) history (e.g., past marketing events offered to a candidate including information regarding which marketing events were accepted by the candidate), and demographic data regarding the candidate. Memory structure 10 additionally comprises a predetermined total budget for each candidate regarding an amount of money that the entity offering the marketing events is willing to spend to offer a plurality of marketing events to the candidate. Memory structure 12 comprises a list identifying marketing events. Memory structure 12 may additionally comprise a predetermined value score associated with each event. A value score is a numerical score (e.g., in dollars) representing an expected profit gain to be produced by a marketing offer (i.e., within a marketing event) from a candidate accepting and executing the marketing offer. Memory structure 19 comprises constraint data regarding the marketing event(s). The constraint data may comprise a first type of data regarding the marketing event(s) as applied to a candidate(s). The first type of constraint data comprises constraints that are associated with offering marketing events to a candidate. For example, constraint data may include, inter alia, an amount of money regarding execution costs for offering the marketing event to a candidate (i.e., an amount that the entity has determined that they are willing is to spend to offer the marketing event to the candidate), a maximum number of offerings for a marketing event (e.g., how many times a marketing event is offered to a candidate), timing between event, etc. Execution costs comprise costs associated with using each of the channels from the marketing events. Execution costs may comprise, inter alia, costs for promotional materials, mailing costs, telemarketing costs, infrastructure costs, etc. The constraint data may comprise a second type of data regarding the marketing events as applied to each other. The second type of data may comprise similarity data for marketing offers within the marketing events, budgetary data regarding a total budgeted amount allotted for offering all of the marketing events in memory structure 12, etc. The second type of data may comprise the matrices (i.e., from table 2 and table 3) and/or timing curve 42 (in FIG. 2) as described with reference to FIG. 2, infra. The optimization tool 8A retrieves a list of candidates from the memory structure 10 and the list identifying marketing events from memory structure 12 and optimizes (e.g., applies) a first time, the marketing events from the list with respect to the candidates. The timing tool 9 applies constraint data (e.g., timing constraints, budget constraints, the second type of data, etc) from the memory structure 19 to determine an optimal sequence for offering the optimized marketing events to the candidates. Additionally, the timing tool 9 may use data (e.g., the second type of data) from the memory structure 19 to determine optimal offer dates for offering each of the optimized/sequenced marketing events or optimal time intervals between offering each of the optimized/sequenced marketing events to the candidates. The timing constraints may be determined using the timing curve as described with respect to FIG. 2, infra. The timing constraints may be used to eliminate any marketing events that comprise timing conflicts between marketing events. For example, the timing tool 9 will take the highest ranked marketing event (first marketing event) and compare it to the next highest ranked marketing event (second marketing event). If the two marketing events comprise a same type of marketing event (e.g., both marketing events comprise a credit card offer), then the timing tool 9 looks for a timing conflict. For example if the first marketing event is to be offered to the candidate every 30 days and the second marketing event is to be offered every 30 days then the second marketing event is eliminated from the ranking list because the two marketing events are same type of marketing event and should not be received by the candidate at the same time. The timing tool 9 will continue to apply the timing constraints to each of the marketing events on the ranking list. Marketing events comprising timing conflicts are eliminated from the ranking list. The timing tool 9 then may apply monetary (i.e., budget) constraints to the remaining marketing events. The predetermined budgeted amount comprises an amount of money for execution costs that the entity has determined that they are willing is to spend to offer a plurality of marketing events to the candidates. The timing tool 9 additionally determines an optimal drop date data for each of the marketing events. A drop date is an origin date for offering the marketing event. The marketing events comprising the drop dates, the first optimal sequence comprising the optimal time intervals are stored as a ranking list in the memory structure 17. The ranking list comprises marketing events that have not been eliminated and an optimal sequence comprising optimal time intervals and optimal drop dates for offering the marketing events to the candidates.

The computing tool 6 uses data (i.e., data-models) supplied from the memory structure 10 to compute response probability scores and ranking scores for each of the first time optimized/sequenced marketing events stored in the memory structure 17 with respect to each of the candidates. The response probability scores are for determining a probability that a candidate(s) will respond to each of the marketing events. In other words, the response probability scores determine a probability that a candidate will respond to and accept a marketing event within a specified time frame. The response probability scores are calculated using the data models comprising any candidate past history data (e.g., credit card balances, past spending habits, etc.). The ranking score is computed as a function of a value score with respect to a response probability score (e.g., by multiplying a value score for a marketing event with a response probability score for a candidate). Each ranking score is associated with a marketing event for a specific candidate. The ranking scores are used to order the marketing events from highest rank to lowest rank to determine an order in which to offer the plurality of marketing events to the specific candidate. The optimization tool 8B sorts the ranking scores for the first time optimized/sequenced marketing events (e.g., from highest rank to lowest rank) for the candidate and a final ranking list comprising re-optimized/sequenced marketing events is created and stored in the memory structure 15.

Table 1 illustrates an example of sorted ranking scores with constraint data applied and subtracted from the budget.

TABLE 1

| Ranking score | Constraint data | Budget |
|---|---|---|
| $50 | $10 | $30 |
| $40 | $5 | $20 |
| $30 | $10 | $15 |
| $20 | $5 | $5 |
| $10 | $10 | $0 |

The first row comprises the highest ranked marketing event ($50 rank). The total budget is $30 and the associated constraint data is $10. The constraint data ($10) is subtracted from the budget ($30) for the highest ranked marketing event leaving $20 in the budget for offering more marketing events to the candidate. The second row comprises the next ranked marketing event ($40 rank). The constraint data ($5) is subtracted from the budget ($20) for the next ranked marketing event ($40 rank) leaving $15 in the budget offering more marketing events to the candidate. The optimization tool goes through each ranked marketing event until there is no more money left in the budget (see row 5) thereby eliminating any more offerings for marketing events. The first four rows comprise the marketing events to be offered sequentially to the candidate. The fifth row comprises an eliminated marketing event due to an exhausted budget ($0).

An example of an implementation for the computing system 2 of FIG. 1 for optimizing and sequencing outbound marketing events for offering to a candidate is described as follows. This example comprises six marketing offers and four channels.

Marketing Offers
1. A Mortgage Offer
2. A Credit Card offer
3. A Household insurance offer
4. An Auto insurance offer
5. A Platinum Credit Card
6. A low rate loan offer Channels
1. Mail
2. Email
3. Outbound telephone call
4. Text message The 6 marketing offers are multiplied by the 4 channels to produce 24 marketing events. An optimization tool 8A tool retrieves the 24 marketing events and a list of candidates and optimizes (e.g., applies) a first time, the marketing events from the list with respect to the candidates. A timing tool 9 applies constraint data (e.g., timing constraints, budget constraints, the second type of data, etc) to determine an optimal sequence for offering the first time optimized marketing events to the candidates from the list. Additionally, the timing tool may use data (e.g., the second type of data) to determine optimal offer dates for offering each of the first optimized/sequenced marketing events or optimal time intervals between offering each of the optimized/sequenced marketing events to the candidates. Next a computing tool 6 scores a first candidate from the candidates for each of the 24 first time optimized/sequenced marketing events with propensity to respond (i.e., a response probability score) to each of the marketing events. All 24 response probability scores are calculated in parallel and each score comprises a range between 0 and 1 with 1 comprising the highest propensity to respond to a marketing event and 0 comprising the lowest propensity to respond to a marketing event. Each of the marketing events comprises an expected profit gain (i.e., value score). For example, if the marketing offer is a mortgage offer, the expected profit margin (i.e., value score) may be calculated based on an annual return of repayments vs. infrastructure costs balanced against the risk of the candidate defaulting on the mortgage vs. prepayment of mortgage before the term is up (although the mortgage may be loaded with a prepayment penalty clause to protect a revenue stream). A ranking score for each of the 24 marketing events is calculated as a function of a value score for each marketing event with respect to a response probability score for the associated marketing event with respect to the first candidate. The aforementioned process is performed by a computing tool (e.g., computing tool 6 in FIG. 1). An optimization tool (e.g., optimization tool 8B in FIG. 1) sorts the ranking scores of the 24 marketing events (e.g., from highest rank to lowest rank) and applies constraint data (e.g., timing constraints, budget constraints, etc.) to each of the sorted marketing events. The constraint data is applied to the 24 marketing events starting with the highest ranked marketing event to the lowest ranking marketing event and ultimately an execution list comprising a second optimized sequence of marketing events is created. The second optimized sequence of marketing events comprises the marketing events that the first candidate will receive. As an alternative, the marketing events may be optimized without using value scores, response probability scores, and ranking scores. Additionally, the marketing events may be optimized using any combination of the value scores, response probability scores, and ranking scores.

Figure 2:
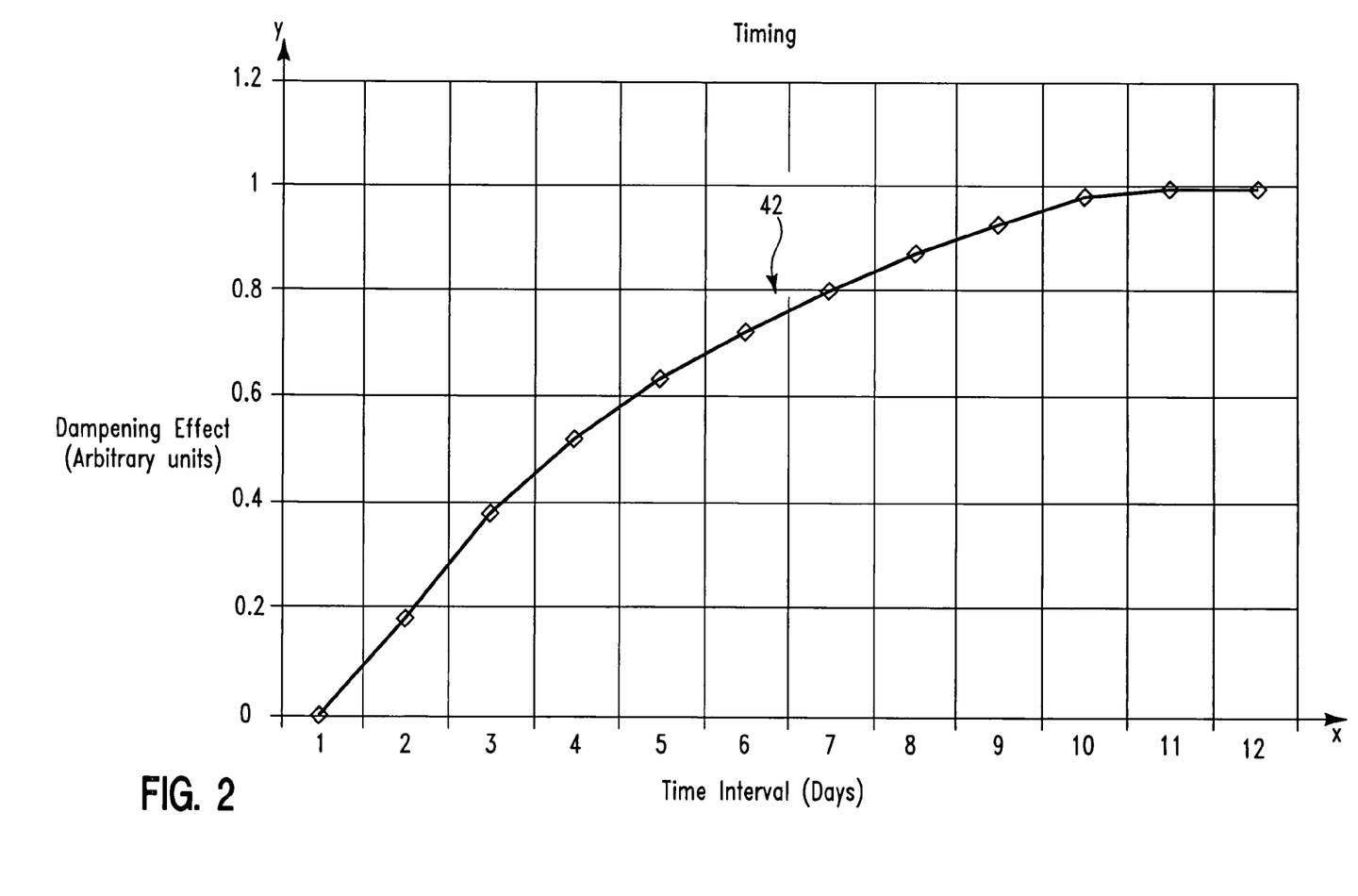
FIG. 2 is a graph illustrating a timing curve used by the computing system of FIG. 1 for sequencing outbound marketing events for offering to candidates, in accordance with embodiments of the present invention.

FIG. 2 is a graph illustrating a timing curve 42 used by the computing system 2 of FIG. 1 for sequencing outbound marketing events for offering to candidates, in accordance with embodiments of the present invention. The Y-axis represents dampening effects (in arbitrary units) of offering successive marketing events. The X-axis represents days (i.e., time intervals) between offering successive marketing events. The timing curve 42 is derived using a one-to-one mapping between data supplied by table 2 (i.e., dampening effects represented on the Y-axis) and data supplied by table 3 (i.e., time intervals represented on the X-axis) as described, infra.

Table 2 illustrates a generation of multipliers or dampening effects for sending successive marketing events.

TABLE 2

| Marketing Event | 1 | 2 | 3 |
|---|---|---|---|
| 1 | 0 | 0.65 | 1 |
| 2 | 0.65 | 0 | 1 |
| 3 | 1 | 1 | 0 |

Table 2 comprises the dampening effects of offering 3 successive marketing events. The marketing events 1, 2, and 3 in the top row comprise a similar marketing event as the respective marketing events 1, 2, and 3 in the first column. Therefore marketing events may be compared for similarities using table 2. For example if marketing event 1 is followed by marketing event 2 for the candidate then the propensity to respond (i.e., as calculated for the candidate) for marketing event 2 is diminished by a dampening effect factor of 0.65. Likewise, if the candidate has been selected to receive marketing event 2 then marketing event 1, the dampening effect factor would be 0.65. The dampening effect factor if we presented marketing event 1 before marketing event 2 it would impact sales (cannibalize) from marketing event 1. Table 2 is used to adjust the stream of marketing events such an optimal return is produced by arranging the marketing events in a manner which will maximize a gain or in other terms minimize the saturative/cannibalization impact of the marketing events.

Table 3 is illustrates a generation of time intervals (i.e., in days) between offering successive marketing events.

TABLE 3

| Marketing Event | 1 | 2 | 3 |
|---|---|---|---|
| 1 | 0 | 5 | 10 |
| 2 | 5 | 0 | 12 |
| 3 | 10 | 12 | 0 |

Table 3 comprises the time intervals between offering 3 successive marketing events. The process is to determine the time intervals such that marketing event indices are maintained. Therefore the above table 3 (i.e., matrix) will become the following (eliminating the diagonal) vector: ((1 2) 5) ((1 3) 10) ((2 1) 5) ((2 3) 12) ((3 1)10) ((3 2)12) etc. Timing is further rationalized, by adopting a decay curve (i.e., timing curve 42) to convert the number of days to a timing point. The timing curve 42 of FIG. 2 is generated by retrieving a value from table 2 (i.e., a dampening effect value for offering successive marketing events and described on the Y-axis) and an associated time interval value from table 3 (i.e., a value for a time interval in days between offering successive marketing events and described on the X-axis) and plotting a data point (i.e., on the graph of FIG. 2) derived by a one-to-one mapping between the dampening effect value and the associated time interval value. For example, if a marketing event 1 (in the first column and second row of tables 2 and 3) is offered to a candidate followed by a marketing event 2 (in the third column and first row of tables 2 and 3) offered to the candidate after a time interval of 5 days (as illustrated in table 3, col. 3, row 2) then the propensity to respond is diminished by a dampening effect factor of 0.65 (as illustrated in table 2, col. 3, row 2). The resulting mapped data point (5, 0.65) is plotted on the graph of FIG. 2 in order to generate timing curve 42. The additional mapped data points are generated in a similar manner. The timing curve 42 comprises an exponential decay curve, although depending on the industry and density of the marketing event plan, appropriate measures may sought by the offering entity.

This example equation represented by the timing curve 42 which has been bounded by zero and one generates a multiplicative effect to convert the number of days apart for any given marketing event offer pair. The multiplicative effects ((1 2) 0.65) ((1 3) 1) ((2 1) 0.65) ((2 3) ((3 1)1) ((3 2)1) etc. are then substituted. This vector is further augmented by adding the saturative values from table 2: ((1 2) (0.65) (0.2)) ((1 3) (1) (0.6)) etc. This represents the state problem. A minima vector has been computed by the timing curve 42. The minima vector is the order or ranking of the marketing events that produces the minima of both the saturative effect and the maxima of the timing effect. The timing curve 42 will generate the optimal plan, in terms of sequencing the marketing events.

Figure 3:
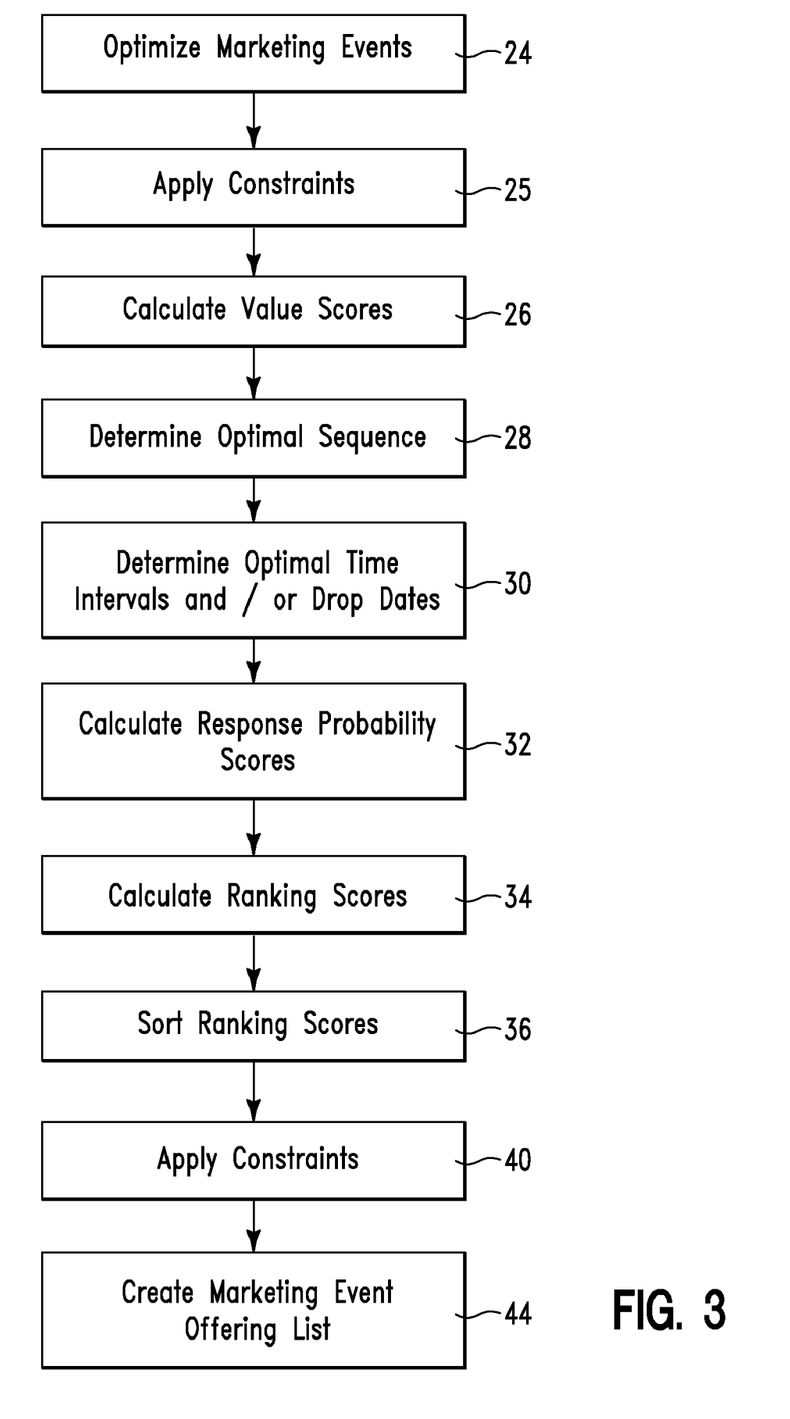
FIG. 3 illustrates a flowchart comprising an algorithm used by computing system of FIG. 1 for optimizing and sequencing outbound marketing events for offering to candidates, in accordance with embodiments of the present invention.

FIG. 3 illustrates a flowchart comprising an algorithm used by computing system 2 of FIG. 1 for optimizing and sequencing outbound marketing events for offering to a candidate, in accordance with embodiments of the present invention. In step 24, the optimization tool 8A optimizes the marketing events for candidates. In step 25, the timing tool 9 applies (i.e., a first time) timing constraints (e.g., the timing curve 42 of FIG. 2 to eliminate timing conflicts between the marketing events) and budgetary constraints (e.g., comprising a predetermined budget for offering marketing events) to each of the marketing events as described with reference to FIG. 1, supra. In step 26, value scores for the marketing events are calculated. The value scores may be calculated based on e.g., an annual return of credit repayments vs infrastructure costs balance against a risk of default on credit repayments as described with reference to FIG. 1, supra. In step 28, the timing tool 9 (using the timing constraints and/or budgetary constraints) determines the optimal sequence for offering the marketing events to the candidates. In step 30, the timing tool 9 (using the timing constraints and/or budgetary constraints) determines the optimal time intervals between offering the marketing events to the candidate and drop date (i.e., offer dates) for each of the marketing events. In step 32, computing tool 6 (of FIG. 1) calculates response probability scores for a first candidate of the candidates. The response probability scores are used to determine a probability that the first candidate will respond to the optimized marketing events. The response probability scores may be calculated (simultaneously) using candidate past history data (e.g., credit card balances, purchasing history, returned-items history, past marketing events that have been accepted by the first candidate, past spending habits associated with the candidates, a predetermined total budget for the candidate regarding an amount of money that an entity offering said marketing events is willing to spend to offer said marketing events to the candidates, etc) as described with reference to FIG. 1, supra. In step 34, computing tool 6 (of FIG. 1) calculates ranking scores for the optimized marketing events. The ranking scores may be calculated by multiplying each response probability score with an associated value score as described with reference to FIG. 1, supra. In step 36, the ranking scores are sorted (resulting in sorted marketing events) as described with reference to FIG. 1, supra. In step 40, the optimization tool 8B (i.e., of FIG. 1) applies timing constraint data and budgetary constraint data to the sorted marketing events as described with reference to FIG. 1, supra. In step 44, an execution list is created as a result of executing step 40 as described with reference to FIG. 1, supra. Note that steps 24, 25, 26, 28, 30, 32, 34, 36, 40, and 44 may be performed in any order. The ranking execution list comprises sequenced marketing events that have not been eliminated (i.e., by timing and monetary constraint data). The execution list comprises a specified sequence for offering the marketing events to the first candidate. Optimizing and sequencing a plurality of marketing events for the candidates may be done in simultaneously. Optimizing and sequencing marketing events produces minima of the saturative effect and maxima of the timing effect for offering the optimized and sequenced marketing events to the first candidate.

Figure 4:
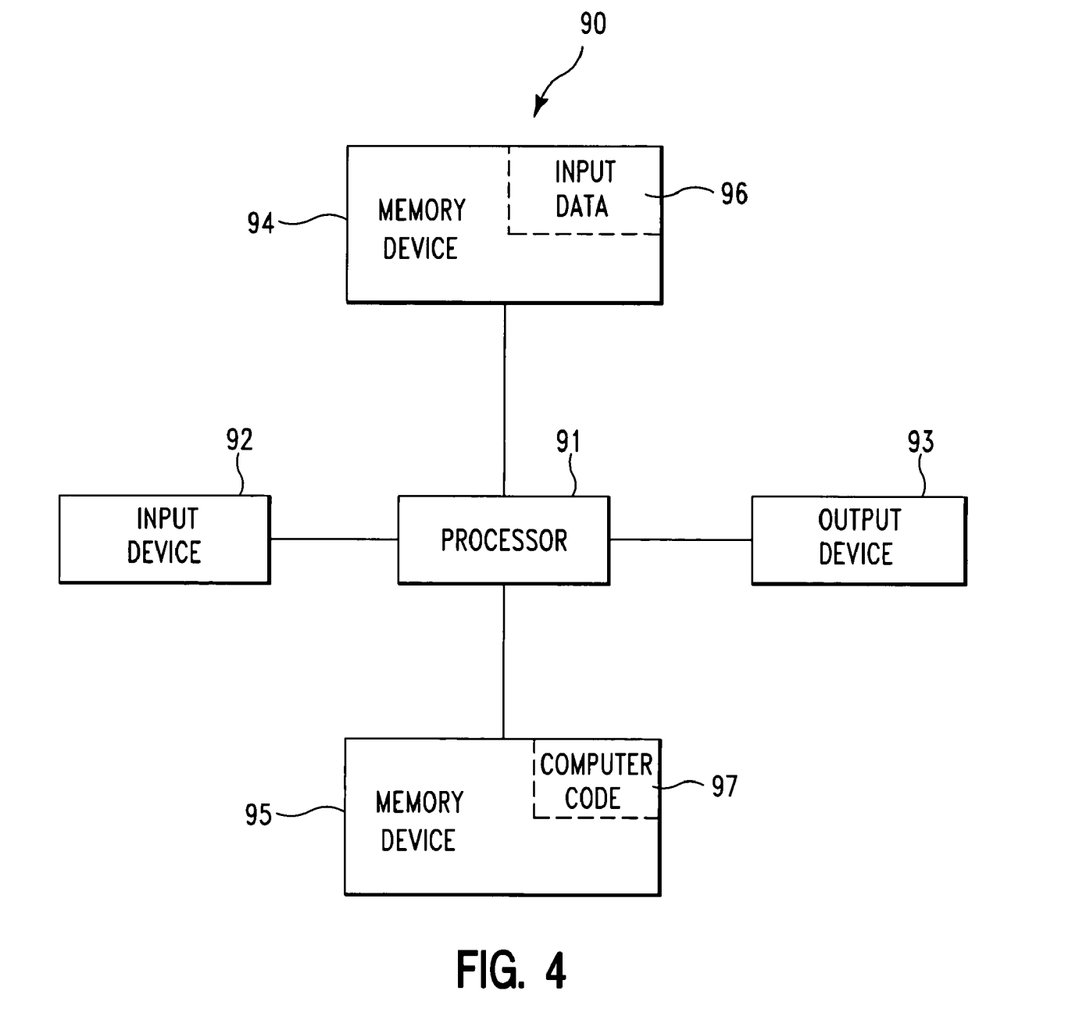
FIG. 4 illustrates a computer system used for implementing the database system for dynamically ordering a plurality of marketing events for offering marketing offers to candidates, in accordance with embodiments of the present invention.

FIG. 4 illustrates a computer system 90 used for implementing the memory system 2 of FIG. 1 for optimizing and sequencing outbound marketing events for offering to a candidate, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for optimizing and sequencing outbound marketing events for offering to a candidate. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the memory system 2 of FIG. 1 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for optimizing and sequencing outbound marketing events for offering to a candidate.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A marketing method, comprising:
  providing a computer system comprising a computer processor and a computer readable memory unit coupled to the computer processor, said memory unit containing a first list identifying marketing events, a second list of candidates, a third list of data consisting of credit card balances, purchasing history, returned-items history, past marketing events that have been accepted by said candidates, past spending habits associated with said second list of candidates, a predetermined total budget for said candidates regarding an amount of money that an entity offering said marketing events is willing to spend to offer said marketing events to the said candidates, and a software application that when executed by the processor implements a method for sequencing said marketing events from said first list, said software application comprising an optimization tool, a computing tool, and a timing tool, and wherein each of said marketing events from said first list comprises a marketing offer associated with a credit based offer and an identified channel means for communicating each said marketing offer;
  optimizing by said optimization tool, said marketing events from said first list for said candidates from said second list;

applying, by said timing tool, constraint data to said marketing events, wherein said constraint data comprises first data, second data, third data, and fourth data, wherein said first data consists of an amount of money regarding execution costs for offering said marketing events to a candidate, wherein said second data consists of budgetary data associated with said marketing events, wherein said third data comprises a maximum number of times for offering said marketing events to said candidates, wherein said fourth data comprises a timing curve comprising dampening effects of offering successive marketing events comprising a same type of marketing offer vs time intervals between offering said successive marketing events, and wherein said execution costs consist of costs for promotional materials, mailing costs, and telemarketing costs;

calculating, by said computing tool, value scores associated with said marketing events from said first list, wherein each value score of said value scores is associated with a marketing event from said first list, wherein said value scores are associated with an expected profit gain associated with each said marketing offer, and wherein each said value score is calculated based on an annual return of credit repayments vs infrastructure costs balanced against a risk of a candidate defaulting on said credit repayments;

determining by said timing tool, an optimal sequence for offering each of said optimized marketing events to said candidates;

determining by said timing tool based on said timing curve, optimal time intervals between offering each of said optimized marketing events in said optimal sequence to said candidates;

calculating, by said computing tool, response probability scores for said optimized marketing events and a first candidate of said candidates, wherein each probability score of said probability scores is used to determine a probability that said first candidate of said will respond to and accept a marketing event of said optimized marketing events within a specified time frame, wherein said response probability scores are calculated using said third list of data, and wherein said response probability scores are computed simultaneously in parallel;

calculating, by said computing tool, a ranking score for each of said optimized marketing events, wherein said calculating each said ranking score comprises multiplying each said response probability score with an associated value score of said value scores;

sorting, by said optimization tool, each said ranking score resulting in sorted marketing events associated with said optimized marketing events;

applying, by said optimization tool, timing constraint data to each sorted marketing event of said sorted marketing events;

applying, by said optimization tool, budgetary constraint data to each said sorted marketing event;

generating, by said computer processor in response to said applying said timing constraint data and said applying said budgetary constraint data, an execution list comprising a second optimized sequence of said sorted marketing events for presentation to said first candidate.

2. The method of claim 1, further comprising determining by said timing tool, said optimal sequence using said budgetary data for said marketing events.

3. The method of claim 1, wherein said optimal sequence comprises optimal offer dates for offering each of said optimized marketing events to said candidates.

4. The method of claim 1, further comprising determining by said timing tool, said optimal time intervals using said budgetary data for said marketing events.

5. The method of claim 1, wherein said optimal sequence maximizes an expected profit gain related to offering each of said optimized marketing events to said candidates.

6. The method of claim 1, further comprising:
providing a database system comprising said software application stored on said computer readable medium; and
executing said software application within said database system.

7. The method of claim 1, wherein each marketing offer is selected from the group consisting of a product offer and a service offer.

8. The method of claim 1, wherein said optimal sequence maximizes an expected profit gain related to offering each of said optimized marketing events to said candidates.

9. The method of claim 1, further comprising:
fourth determining, by said computer system, a plurality of channels for offering each said marketing event.

10. The method of claim 9, wherein plurality of channels comprise a mail channel, an email channel, a telephone channel, and a text message channel.

11. A computer system comprising a computer processor and a computer readable memory unit coupled to the computer processor, said memory unit containing a first list identifying marketing events, a second list of candidates, a third list of data consisting of credit card balances, purchasing history, returned-items history, past marketing events that have been accepted by said candidates, past spending habits associated with said second list of candidates, a predetermined total budget for said candidates regarding an amount of money that an entity offering said marketing events is willing to spend to offer said marketing events to the said candidates, and a software application that when executed by the computer processor implements a method for sequencing said marketing events from said first list, said software application comprising an optimization tool, a computing tool, and a timing tool, and wherein each of said marketing events from said first list comprises a marketing offer associated with a credit based offer and an identified channel means for communicating each said marketing offer, said method comprising the computer implemented steps of:

optimizing by said optimization tool, said marketing events from said first list for said candidates from said second list;

applying, by said timing tool, constraint data to said marketing events, wherein said constraint data comprises first data, second data, third data, and fourth data, wherein said first data consists of an amount of money regarding execution costs for offering said marketing events to a candidate, wherein said second data consists of budgetary data associated with said marketing events, wherein said third data comprises a maximum number of times for offering said marketing events to said candidates, wherein said fourth data comprises a timing curve comprising dampening effects of offering successive marketing events comprising a same type of marketing offer vs time intervals between offering said successive marketing events, and wherein said execution costs consist of costs for promotional materials, mailing costs, and telemarketing costs;

calculating, by said computing tool, value scores associated with said marketing events from said first list, wherein each value score of said value scores is associated with a marketing event from said first list, wherein said value scores are associated with an expected profit gain associated with each said marketing offer, and wherein each said value score is calculated based on an annual return of credit repayments vs infrastructure costs balanced against a risk of a candidate defaulting on said credit repayments;

determining by said timing tool, an optimal sequence for offering each of said optimized marketing events to said candidates;

determining by said timing tool based on said timing curve, optimal time intervals between offering each of said optimized marketing events in said optimal sequence to said candidates;

calculating, by said computing tool, response probability scores for said optimized marketing events and a first candidate of said candidates, wherein each probability score of said probability scores is used to determine a probability that said first candidate will respond to and accept a marketing event of said optimized marketing events within a specified time frame, wherein said response probability scores are calculated using said third list of data, and wherein said response probability scores are computed simultaneously in parallel;

calculating, by said computing tool, a ranking score for each of said optimized marketing events, wherein said calculating each said ranking score comprises multiplying each said response probability score with an associated value score of said value scores;

sorting, by said optimization tool, each said ranking score resulting in sorted marketing events associated with said optimized marketing events;

applying, by said optimization tool, timing constraint data to each sorted marketing event of said sorted marketing events;

applying, by said optimization tool, budgetary constraint data to each said sorted marketing event;

generating, by said computer processor in response to said applying said timing constraint data and said applying said budgetary constraint data, an execution list comprising a second optimized sequence of said sorted marketing events for presentation to said first candidate.

12. The computer system of claim 11, wherein said method further comprises:
determining by said timing tool, said optimal sequence using said budgetary data for said marketing events.

13. The computer system of claim 11, wherein said optimal sequence comprises optimal offer dates for offering each of said optimized marketing events to said candidates.

14. The computer system of claim 11, wherein said method further comprises:
determining by said timing tool, said optimal time intervals using said budgetary data for said marketing events.

15. The computer system of claim 11, wherein said optimal sequence maximizes an expected profit gain related to offering each of said optimized marketing events to said candidates.

16. The computer system of claim 11, wherein said method further comprises:
providing a database system comprising said software application stored on said computer readable medium; and
executing said software application within said database system.

17. The computer system of claim 11, wherein said optimal sequence maximizes an expected profit gain related to offering each of said optimized marketing events to said candidates.

18. A process for integrating computing infrastructure, comprising integrating computer-readable code into a computing system comprising a computer processor, wherein the code in combination with the computing system comprises a first list identifying marketing events, a second list of candidates, a third list of data consisting of credit card balances, purchasing history, returned-items history, past marketing events that have been accepted by said candidates, past spending habits associated with said second list of candidates, a predetermined total budget for said candidates regarding an amount of money that an entity offering said marketing events is willing to spend to offer said marketing events to the said candidates, and a software application that when executed by the computer processor implements a method for sequencing said marketing events from said first list, said software application comprising an optimization tool, a computing tool, and a timing tool, wherein each of said marketing events from said first list comprises a marketing offer associated with a credit based offer and an identified channel means for communicating each said marketing offer, and wherein the code in combination with the computing system is adapted to implement a method for performing the steps of:

optimizing by said optimization tool, said marketing events from said first list for said candidates from said second list;

applying, by said timing tool, constraint data to said marketing events, wherein said constraint data comprises first data, second data, third data, and fourth data, wherein said first data consists of an amount of money regarding execution costs for offering said marketing events to a candidate, wherein said second data consists of budgetary data associated with said marketing events, wherein said third data comprises a maximum number of times for offering said marketing events to said candidates, wherein said fourth data comprises a timing curve comprising dampening effects of offering successive marketing events comprising a same type of marketing offer vs time intervals between offering said successive marketing events, and wherein said execution costs consist of costs for promotional materials, mailing costs, and telemarketing costs;

calculating, by said computing tool, value scores associated with said marketing events from said first list, wherein each value score of said value scores is associated with a marketing event from said first list, wherein said value scores are associated with an expected profit gain associated with each said marketing offer, and wherein each said value score is calculated based on an annual return of credit repayments vs infrastructure costs balanced against a risk of a candidate defaulting on said credit repayments;

determining by said timing tool, an optimal sequence for offering each of said optimized marketing events to said candidates;

determining by said timing tool in response to said receiving based on said timing curve, optimal time intervals between offering each of said optimized marketing events in said optimal sequence to said candidates;

calculating, by said computing tool, response probability scores for said optimized marketing events and a first candidate of said candidates, wherein each probability score of said probability scores is used to determine a probability that said first candidate will respond to and accept a marketing event of said optimized marketing events within a specified time frame, wherein said response probability scores are calculated using said third list of data, and wherein said response probability scores are computed simultaneously in parallel;

calculating, by said computing tool, a ranking score for each of said optimized marketing events, wherein said calculating each said ranking score comprises multiplying each said response probability score with an associated value score of said value scores;

sorting, by said optimization tool, each said ranking score resulting in sorted marketing events associated with said optimized marketing events;

applying, by said optimization tool, timing constraint data to each sorted marketing event of said sorted marketing events;

applying, by said optimization tool, budgetary constraint data to each said sorted marketing event;

generating, by said computer processor in response to said applying said timing constraint data and said applying said budgetary constraint data, an execution list comprising a second optimized sequence of said sorted marketing events for presentation to said first candidate.

19. The process of claim 18, wherein said method further comprises:
determining by said timing tool, said optimal sequence using said budgetary data for said marketing events.

20. The process of claim 18, wherein said optimal sequence comprises optimal offer dates for offering each of said optimized marketing events to said candidates.

21. The process of claim 18, wherein said method further comprises:
determining by said timing tool, said optimal time intervals using said budgetary data for said marketing events.

22. The process of claim 18, wherein said optimal sequence maximizes an expected profit gain related to offering each of said optimized marketing events to said candidates.

23. The process of claim 18, wherein said method further comprises:
providing a database system comprising said software application stored on said computer readable medium; and
executing said software application within said database system.

24. The process of claim 18, wherein said optimal sequence maximizes an expected profit gain related to offering each of said optimized marketing events to said candidates.

25. A computer program product, comprising a computer readable medium having a computer readable program code embodied therein, said computer readable program code comprising an algorithm adapted to implement a method for sequencing marketing events, wherein said computer readable medium comprises a first list identifying marketing events, a second list of candidates, a third list of data consisting of credit card balances, purchasing history, returned-items history, past marketing events that have been accepted by said candidates, past spending habits associated with said second list of candidates, a predetermined total budget for said candidates regarding an amount of money that an entity offering said marketing events is willing to spend to offer said marketing events to the said candidates, and a software application that when executed by the computer processor implements a method for sequencing said marketing events from said first list, said software application comprising an optimization tool, a computing tool, and a timing tool, and wherein each of said marketing events from said first list comprises a marketing offer associated with a credit based offer and an identified channel means for communicating each said marketing offer, said method comprising the steps of:

optimizing by said optimization tool, said marketing events from said first list for said candidates from said second list;

applying, by said timing tool, constraint data to said marketing events, wherein said constraint data comprises first data, second data, third data, and fourth data, wherein said first data consists of an amount of money regarding execution costs for offering said marketing events to a candidate, wherein said second data consists of budgetary data associated with said marketing events, wherein said third data comprises a maximum number of times for offering said marketing events to said candidates, wherein said fourth data comprises a timing curve comprising dampening effects of offering successive marketing events comprising a same type of marketing offer vs time intervals between offering said successive marketing events, and wherein said execution costs consist of costs for promotional materials, mailing costs, and telemarketing costs;

calculating, by said computing tool, value scores associated with said marketing events from said first list, wherein each value score of said value scores is associated with a marketing event from said first list, wherein said value scores are associated with an expected profit gain associated with each said marketing offer, and wherein each said value score is calculated based on an annual return of credit repayments vs infrastructure costs balanced against a risk of a candidate defaulting on said credit repayments;

determining by said timing tool, an optimal sequence for offering each of said optimized marketing events to said candidates;

determining by said timing tool based on said timing curve, optimal time intervals between offering each of said optimized marketing events in said optimal sequence to said candidates;

calculating, by said computing tool, response probability scores for said optimized marketing events and a first candidate of said candidates, wherein each probability score of said probability scores is used to determine a probability that said first candidate will respond to and accept a marketing event of said optimized marketing events within a specified time frame, wherein said response probability scores are calculated using said third list of data, and wherein said response probability scores are computed simultaneously in parallel;

calculating, by said computing tool, a ranking score for each of said optimized marketing events, wherein said calculating each said ranking score comprises multiplying each said response probability score with an associated value score of said value scores;

sorting, by said optimization tool, each said ranking score resulting in sorted marketing events associated with said optimized marketing events;

applying, by said optimization tool, timing constraint data to each sorted marketing event of said sorted marketing events;

applying, by said optimization tool, budgetary constraint data to each said sorted marketing event;

generating, by said computer processor in response to said applying said timing constraint data and said applying said budgetary constraint data, an execution list comprising a second optimized sequence of said sorted marketing events for presentation to said first candidate.

26. The computer program product of claim 25, wherein said method further comprises:

determining by said timing tool, said optimal sequence using said budgetary data for said marketing events.

27. The computer program product of claim 25, wherein said optimal sequence comprises optimal offer dates for offering each of said optimized marketing events to said candidates.

28. The computer program product of claim 25, wherein said method further comprises:

determining by said timing tool, said optimal time intervals using said budgetary data for said marketing events.

29. The computer program product of claim 25, wherein said optimal sequence maximizes an expected profit gain related to offering each of said optimized marketing events to said candidates.

30. The computer program product of claim 25, wherein said method further comprises:

providing a database system comprising said software application stored on said computer readable medium; and executing said software application within said database system.

31. The computer program product of claim 25, wherein said optimal sequence maximizes an expected profit gain related to offering each of said optimized marketing events to said candidates.

* * * * *